(12) United States Patent
Stern et al.

(10) Patent No.: US 9,116,982 B1
(45) Date of Patent: Aug. 25, 2015

(54) IDENTIFYING INTERESTING COMMONALITIES BETWEEN ENTITIES

(71) Applicant: GOOGLE INC., Mountain View, CA (US)

(72) Inventors: Tamara I. Stern, New York, NY (US); Gregory J. Donaker, Brooklyn, NY (US); Jason Lee, Forest Hills, NY (US); Bernhard A. M. Seefeld, New York, NY (US)

(73) Assignee: Google Inc., Mountain View, CA (US)

( * ) Notice: Subject to any disclaimer, the term of this patent is extended or adjusted under 35 U.S.C. 154(b) by 130 days.

(21) Appl. No.: 13/803,355

(22) Filed: Mar. 14, 2013

Related U.S. Application Data

(60) Provisional application No. 61/639,226, filed on Apr. 27, 2012.

(51) Int. Cl.
*G06F 17/30* (2006.01)

(52) U.S. Cl.
CPC .... *G06F 17/30707* (2013.01); *G06F 17/30011* (2013.01); *G06F 17/30598* (2013.01)

(58) Field of Classification Search
None
See application file for complete search history.

(56) References Cited

U.S. PATENT DOCUMENTS

| | | | |
|---|---|---|---|
| 5,689,809 A | 11/1997 | Grube et al. | |
| 5,930,474 A | 7/1999 | Dunworth et al. | |
| 6,629,097 B1 * | 9/2003 | Keith | 1/1 |
| 7,853,596 B2 | 12/2010 | Ma et al. | |
| 8,051,087 B2 | 11/2011 | Campbell et al. | |
| 8,229,464 B1 | 7/2012 | Wu | |
| 8,352,178 B2 | 1/2013 | Allen et al. | |
| 8,612,134 B2 | 12/2013 | Zheng et al. | |
| 2009/0164171 A1 * | 6/2009 | Wold et al. | 702/179 |
| 2009/0193328 A1 | 7/2009 | Reis et al. | |
| 2012/0215777 A1 * | 8/2012 | Malik et al. | 707/737 |

\* cited by examiner

*Primary Examiner* — Hung Q Pham
(74) *Attorney, Agent, or Firm* — Fish & Richardson P.C.

(57) ABSTRACT

Methods, systems, and apparatus, including computer programs encoded on a computer storage medium, for generating descriptions of relationships between entities. In one aspect, a method includes identifying one or more related entities for a particular entity based at least in part on commonalities between the particular entity and the one or more related entities, sorting the commonalities according to a measure of uniqueness of each of the commonalities, and identifying a subset of the commonalities having a measure of uniqueness above a lower measure of uniqueness threshold. The identified subset of commonalities can include one or more commonalities. One or more commonalities can be selected from the subset of commonalities as indicative of a relationship to the particular entity, and a description of the relationship can be identified based on the selected one or more commonalities.

22 Claims, 10 Drawing Sheets

| 702 Commonality Terms | 704 Uniqueness |
|---|---|
| Pizza | 80 |
| Downtown | 95 |
| Wine | 110 |
| Checkered Tablecloth | 200 |
| Wood-Fired Oven | 285 |
| Fresh sauce | 300 |
| Brick Walls | 450 |
| Black and White Photos | 560 |
| Reminds Me of the Time | 600 |
| Coat Rack | 675 |

708 (highlighting rows: Checkered Tablecloth, Wood-Fired Oven, Fresh sauce, Brick Walls)

| 706 | |
|---|---|
| Average | 335.5 |
| Standard Deviation | 222.3 |
| Minimum Value | 113.2 |
| Maximum Value | 557.8 |

FIG. 7

IDENTIFYING INTERESTING COMMONALITIES BETWEEN ENTITIES

This Application claims priority under 35 U.S.C. §119(e) to U.S. Provisional Patent Application Ser. No. 61/639,226, filed on Apr. 27, 2012. The entire contents of U.S. Provisional Patent Application Ser. No. 61/639,226 is hereby incorporated by reference.

BACKGROUND

This specification relates to identifying interesting common features between different entities.

Internet search engines can identify documents or other items that are responsive to user queries and present search results to users through a web interface. Internet search engines can return search results in response to a user submitted query. Search results can be supplemented with information such as advertisements, news, or weather. For example, advertisement information can include sponsorship information and an associated link to a web address. Search results can also be supplemented by displaying or providing access to other types of related information. For example, a search result that identifies a web page may be presented along with a link to, or a listing of, one or more similar web pages. A search result that identifies a place may be presented along with a link to, or a listing of, one or more similar places (e.g., restaurants that serve the same type of food). Similar results may be identified, for example, based on the results sharing the same category and/or located within the same general vicinity.

SUMMARY

This specification describes technologies relating to identifying aspects of, features of, or information about different entities (e.g., businesses) that describe an interesting (e.g., features that are moderately unique to the different entities) relationship between the entities.

In general, one innovative aspect of the subject matter described in this specification can be embodied in methods that include the actions of identifying one or more related entities for a particular entity based at least in part on a plurality of commonalities between the particular entity and the one or more related entities; sorting the plurality of commonalities according to a measure of uniqueness of each of the plurality of commonalities; identifying a subset of the plurality of commonalities having a measure of uniqueness above a lower measure of uniqueness threshold, wherein the identified subset of commonalities includes one or more commonalities; selecting one or more commonalities from the subset of commonalities as indicative of a relationship to the particular entity; and identifying a description of the relationship based on the selected one or more commonalities. Other embodiments of this aspect include corresponding systems, apparatus, and computer programs, configured to perform the actions of the methods, encoded on computer storage devices.

These and other embodiments can each optionally include one or more of the following features. Identifying the one or more related entities is further based on a plurality of categories of potential commonalities, with each category of potential commonalities including a respective plurality of commonalities between the particular entity and one or more related entities, and a particular category of potential commonalities is selected, wherein the plurality of commonalities includes the respective plurality of commonalities for the particular category of potential commonalities. Selecting the particular category of potential commonalities includes ranking the plurality of categories of potential commonalities according to a contribution of the respective plurality of commonalities for each category of potential commonalities to a relatedness of the one or more related entities to the particular entity; and selecting the particular category of potential commonalities based on the ranking. Ranking the plurality of categories of potential commonalities according to the contribution of the respective plurality of commonalities to the relatedness of the one or more related entities to the particular entity includes weighting each category of potential commonalities according to predetermined category weights. The predetermined category weights are determined by receiving ratings of a relatedness of entities; calculating a plurality of similarity scores for the entities, with each similarity score corresponding to each of the plurality of categories of potential commonalities; and performing a linear regression analysis using the plurality of similarity scores and the ratings of the relatedness of the entities to calculate the category weights. The measure of uniqueness of each of the plurality of commonalities includes a quantity of related entities that share the commonality. Identifying a subset of the plurality of commonalities includes calculating an average measure of uniqueness for the plurality of commonalities; and identifying a commonality having a measure of uniqueness within about a standard deviation of the average measure of uniqueness. The measure of uniqueness of each of the plurality of commonalities relates to a frequency of description of the commonality in a corpus of resources. Selecting one or more commonalities from the subset of commonalities as indicative of a relationship to the particular entity includes at least one of identifying commonalities of potential interest to a user based on prior user interactions; identifying commonalities associated with trusted information sources; or selecting a plurality of commonalities, with each selected commonality corresponding to a different category of potential commonalities. The plurality of commonalities is selected for a user based on indications of interest in particular information by the user. Identifying a description of the relationship based on the selected one or more commonalities includes identifying text associated with the selected one or more commonalities. The description of the relationship is displayed in a user interface in association with an identifier of the particular entity. The plurality of commonalities are selected from one or more categories of potential commonalities including references to the particular entity and one or more related entities in a common web page; references to the particular entity and one or more related entities by a particular content author; identification of the particular entity and one or more related entities in a common web browsing session; one or more common categories associated with the particular entity and one or more related entities; one or more common attributes associated with the particular entity and one or more related entities; one or more common terms identified as representative of the particular entity and one or more related entities; an association of the particular entity and one or more related entities within a hierarchical entity structure; common sentiment phrases extracted from documents associated with the particular entity and documents associated with one or more related entities; an association of a waypoint for the particular entity and waypoints for one or more related entities with a user-defined map; or an identification of a web page associated with the particular entity and webpages associated with the one or more related entities as similar web pages.

In general, another aspect of the subject matter described in this specification can be embodied in methods that include the actions of receiving an identification of one or more related entities for a particular entity, wherein the related entities are identified based at least in part on a plurality of commonalities between the particular entity and the one or more related entities; eliminating at least a portion of the plurality of commonalities to generate a subset of commonalities based, at least in part, on a frequency of occurrence of the commonalities in a corpus of resources above a threshold frequency level; selecting one or more commonalities from the subset of commonalities as indicative of a relationship to the particular entity; and identifying a description of the relationship based on the selected one or more commonalities. Other embodiments of this aspect include corresponding systems, apparatus, and computer programs, configured to perform the actions of the methods, encoded on computer storage devices.

These and other embodiments can each optionally include one or more of the following features. The threshold frequency level is based on an average frequency of occurrence of the plurality of commonalities. Selecting one or more commonalities from the subset of commonalities as indicative of a relationship to the particular entity is performed for a particular user based at least in part on data identifying prior interactions by the user with one or more web documents. A relative contribution for each of a plurality of categories of commonalities to a level of relatedness between the particular entity and the one or more related entities is determined, and at least a portion of the plurality of commonalities are eliminated to generate the subset of commonalities based, at least in part, on a relatively low contribution of one or more categories of commonalities to the level of relatedness.

In general, another aspect of the subject matter described in this specification can be embodied in system that include one or more related entity identification servers adapted to identify related entities based on a plurality of commonalities between a first entity and a second entity; and one or more processing servers adapted to identify descriptions of relationships between related entities based on one or more candidate commonalities by: identifying one of a plurality of categories of commonalities as providing a greater relative contribution to a relatedness of the first entity and the second entity; eliminating a subset of the commonalities from the plurality of commonalities as candidate commonalities based on an insufficient level of uniqueness of the commonalities in the subset of commonalities; selecting one or more of the commonalities that remain after eliminating a subset of the commonalities as indicative of a basis for a relationship between the first entity and the second entity; and identifying a description of the relationship between the first entity and the second entity based on the one or more selected commonalities.

These and other embodiments can each optionally include one or more of the following features. The one or more related entity identification servers are adapted to identify related entities by calculating a Jaccard index for the first entity and the second entity. Identifying one of a plurality of categories of commonalities as providing a greater relative contribution to a relatedness of the first entity and the second entity is based on a weighted similarity score for each of the plurality of categories of commonalities. The weighted similarity score for each category of commonalities is based on a combination of a similarity score calculated using commonalities in the category of commonalities and a weighting corresponding to a predetermined level of contribution of the category of commonalities to the relatedness of related entities. The system includes one or more initialization servers adapted to receive ratings indicating a level of relatedness of a sample set of entities; calculate a similarity score for each pair of entities in the sample set of entities, wherein each similarity score corresponds to a different one of the plurality of categories of commonalities and the similarity score is calculated using commonalities for the pair of entities in the corresponding category of commonalities; and perform a linear regression analysis to calculate the weighting for each category of commonalities based on the received ratings and the calculated similarity scores.

Particular embodiments of the subject matter described in this specification can be implemented so as to realize one or more of the following advantages. Data, documents, or other resources (or information extracted from such resources) (i.e., signals) that indicate a relationship between entities can be analyzed to identify terms or phrases that describe a type of relationship or similarity between different entities. Examining signals of different signal types can facilitate automatic selection of the most relevant signal type or types for describing a relationship between arbitrary entities. Signals that indicate a commonality and descriptions of the commonality that are potentially interesting to users can be automatically identified based on an analysis of the importance of the signal type associated with the signal and/or a relative uniqueness of a commonality associated with the signal. Interesting descriptions of commonalities can be identified by avoiding signals that are very common, identifying signals that are particularly interesting to a particular user, favoring trusted signals, and/or choosing signals that are within some threshold (e.g., a standard deviation) of an average number of related entities among all signals (i.e., by determining a quantity of entities that share each signal associated with a particular entity and averaging that quantity across all signals associated with the particular entity). Signals from different signal types can be paired to create more descriptive pairs of commonalities (e.g., "cheap wine and near subway"). Identifying or indexing similarities by commonality descriptions enables display of entities with the commonality. Presenting a commonality in association with an entity helps users locate other places that share that commonality (e.g., show me more places where Mario Batali is the chef) and identifying one or more similar entities that share a commonality helps users understand how the entities are alike. Moreover, presenting commonalities and/or related entities encourage user interaction with a graphical user interface and enhances the quality of information presented to the user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 7 shows an example of data used to select commonalities.

Like reference numbers and designations in the various drawings indicate like elements.

DETAILED DESCRIPTION

Figure 1:
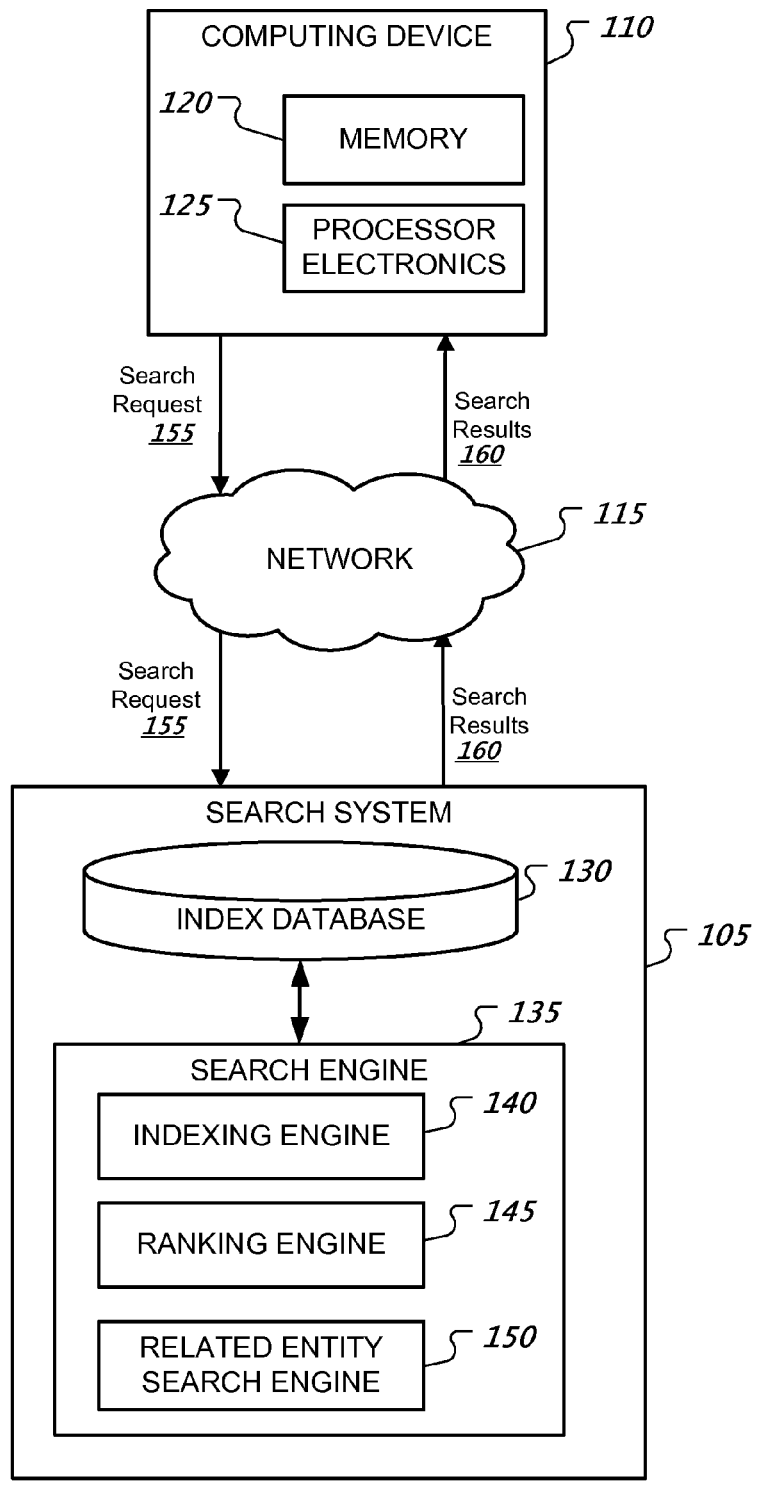
FIG. 1 is an example of a search system communicating with a computing device.

In general, computer systems can store information about various entities for use in presenting such information about the entities to users. For example, users can conduct searches for entities that satisfy certain criteria or can retrieve information about one or more particular entities. In addition, a computer system can present information about an entity to a user in response to determining that the entity may be of interest to the user (e.g., based on areas of interest). An entity can be a representation of a material thing, an abstraction, a concept, or a fictitious person, place, or thing. As an example, an entity can be a business, although entities can also include locations, organizations, media, persons, or any other unique or identifiable place, object, or thing. Names and descriptive terms can be associated with entities.

Various electronic documents and other resources can be analyzed to identify commonalities (e.g., features, descriptions, associations, etc.) between entities, and entities that are related can be identified based on the commonalities. For example, an overall similarity score can be calculated for various pairs of entities based on common terms, phrases, or other features. The scores and features can be used by services to, for example, provide users with links to similar entities and/or to descriptors of similarities between different entities. In particular, the commonalities can be analyzed to identify relatively unique descriptions of commonalities between the entities. Relatively unique descriptions of commonalities can be identified by selecting one or more signals from among a large number (e.g., tens, hundreds, or thousands) of signals that indicate a relationship between entities. In general, a signal is simply some type of data from which other information may be inferred. Signals can include terms that appear in a resource that describes, discusses, or otherwise relates to one or more entities; an identification of two or more entities in a common resource or from a common source; one or more terms in a search query that frequently result in a user selecting a particular entity; information from a browsing session; location or temporal information associated with an entity; or any other type of data from which information may be inferred.

One or more signals that indicate a relationship between entities can be selected by determining how many different entities share each signal and avoiding both signals that occur frequently and signals that occur infrequently. Among the remaining signals, the one or more signals can be selected based on which types of signals are most important to the relatedness of the entities, which signals are interesting to a particular user, and/or how trusted a source of information is for each signal, although other criteria for selecting among the remaining signals can also be used. For example, signals can be selected randomly or signals can be selected based on whether the signals fall within a list of signals predetermined to be appropriate for use in describing related entities. Based on the one or more selected signals, a descriptive term or phrase can be identified for each selected signal to describe the commonality. For example, in some cases, the signal itself may be a term or phrase that appears in resources (e.g., web pages, category descriptions, or reviews) relating to each of the related entities and that term or phrase can be selected as an interesting description of the relationship (i.e., a description of an interesting commonality). In other cases, the signal may be that two or more entities appear on the same web page, user-generated map, or other resource, and a title or other description associated with the web page, user-generated map, or other resource can be selected as an interesting description of the relationship. Detection of signals that indicate a relationship and identification of commonality descriptions can be performed at various times in the overall process. For example, commonality descriptions can be determined during indexing of resources or can be determined when executing a search. In some implementations, once one or more commonality descriptions are identified, the commonality descriptions can be presented to users (e.g., in association with entities listed in a set of search results to allow the users to explore similar entities), and a frequency of selection by users of the commonality descriptions can be tracked to identify signals of greatest interest.

FIG. 1 is an example of a search system communicating with a computing device. A search system 105 can provide search results relevant to submitted queries as can be implemented in an internet, an intranet, or another client and server environment. The search system 105 is an example of an information retrieval environment in which the systems, components, and techniques described below can be implemented. In particular, among other things, the search system 105 can identify related entities and identify terms or phrases that describe the interesting features of the relationship. Such identifications of related entities and terms or phrases that describe the relationship can be generated before receiving a search request (e.g., the relationship information can be stored in an index) or, in some implementations, in response to a search request. In addition, the search system 105 can identify related entities and terms or phrases that describe the relationship for use in presenting information to users in situations that do not necessarily involve submitting a search request. For example, when a user selects a particular entity on a map, the search system 105 can identify related entities and provide a description of one or more interesting relationships. A search system 105 can include one or more processing devices such as servers. For example, a search system can be configured to run one or more computer programs on one or more computers in one or more locations that are coupled to each other via a network. The search system 105 can include an index database 130 and a search engine 135. The index database 130 can store information for use in identifying search results that are relevant to a search query. An indexing engine 140 can process information from resources (e.g., web pages, images, videos, audio content, or news articles on the Internet) found in a corpus (e.g., a collection or repository of content) and store information in the index database 130 for subsequent use in generating search results or otherwise identifying resources or information that may be relevant to a user. In general, a database, including the index database 130, need not correspond to a single database stored on a single server but can include, for example, data stored on any number of distributed servers from which the data can be accessed and processed.

A user can interact with the search system 105 through a computing device 110 such as a personal computer, touch screen terminal, workstation, network computer, kiosk, wireless data port, mobile phone, personal data assistant (PDA), one or more processors within these or other devices. For example, the computing device 110 can be a computer coupled to the search system 105 through a network 115 such as a local area network (LAN) or wide area network (WAN), e.g., the Internet. In some implementations, a data processing device can include the search system 105 and the computing device 110. For example, a user can install a desktop search application on the computing device 110. The computing device 110 can include a memory 120 such as a random access memory (RAM) and processor electronics 125, which can include one or more processors. In addition or as an alternative, other servers in a computer system can interact with the search system 105 to retrieve information about entities that are related to a particular entity or simply about a set of related entities that share a common feature. Search results can thus be provided in response to not just a user-initiated search query but also to other search requests, which may be initiated by a user, by another server in the search system 105, or by servers external to the search system 105.

The computing device 110 can present a Graphical User Interface (GUI) via a display such as a computer monitor to facilitate user interactions with the search system 105. For example, the computing device 110 can run a GUI such as a web browser. A web browser can be used to submit a query to the search system 105 and receive a web page from the search system 105 that includes the results of the query. A query can be text (e.g., one or more search terms), an image, or a sound or voice recording, for example. In some implementations, a finger gesture on a touch screen input enabled GUI can generate a query.

A user can submit a search query or other search request 155 to a search engine 135 associated with a search system 105. When the user submits a search request 155, the request 155 is transmitted through a network 115 to the search system 105. The search system 105 can respond to the request 155 by generating search results 160. The search system 105 can transmit the search results 160 via the network 115 to the computing device 110 in a form that can be presented to the user (e.g., as a search results web page to be displayed in a web browser running on the computing device 110).

When the request 155 is received by the search engine 135, the search engine 135 identifies resources that may provide information relevant or responsive to the request 155 based on information stored in the index database 130. In response to the search request 155, a ranking engine 145 (or other software) ranks the resources that are identified as responsive to the request 155. The search engine 135 can transmit the search results 160 through the network 115 to the computing device 110 for presentation to the user. In some cases, the resources can be in the form of electronic documents. An electronic document (which for brevity will simply be referred to as a document) may, but need not, correspond to a file. A document may be stored in a portion of a file that holds other documents, in a single file dedicated to the document in question, or in multiple coordinated files. Documents may be in any of a variety of different formats, including HTML, MP3 or other audio, graphics or video files, PDF, multimedia formats, etc.

The search engine 135 can include a related entity search engine 150 configured to find entities that are related to an entity specified in a search query or other search request. In some implementations, the search engine 135 can be configured to access the related entity search engine 150 in response to a search request. For example, the search engine 135 may identify other entities related to entities contained in the search results 160 and/or descriptions of features that form the basis for relationships with related entities. The related entities and/or descriptive features can be included in a web page or other electronic document that returns the search results 160 in response to a search request 155. Alternatively, a search request 155 can include an operator to specify that a related entity search should be performed for a particular identified entity. Based on such an operator, the related entity search engine 150 can perform a search for related entities and/or identify terms or phrases that describe a potentially interesting relationship feature. For example, when a user requests a geographical map that includes a waypoint of a specified entity, the search engine 135 can augment geographical map data with waypoints of entities related to the specified entity.

Thus, a search engine can identify search results that may include one or more potential target entities responsive to or otherwise relevant to a search request, and the related entity search engine 150 can identify candidate entities that may be related to a target entity of the one or more target entities. The related entity search engine 150 may also identify candidate entities that may be related to a target entity identified in a manner other than in response to a search request (e.g., a user selection of a target entity on a map). The related entity search engine 150 can access information stored, e.g., in the index database 130 that identifies one or more commonalities between the target entity and a candidate entity. Moreover, entities, such as business entities, may have multiple commonalities. Generally speaking, a commonality is a sharing of one or more features, characteristics, or attributes in common. Various examples of commonalities include offers from two different entities a similar product or service, identical descriptors (e.g., "open late," "kid friendly," "handicap accessible") mentioned in their respective web sites of different entities, different entities being identified in the same resource, different entities being in a geographical proximity of each other, and different entities having similar sentiment phrases (e.g., both entities having "good thin crust pizza" or a "great wine list"). Generally speaking, a sentiment is an attitude or opinion toward something such as an entity. A sentiment may be expressed in words. A grouping of two or more words that express a sentiment can be referred to as a sentiment phrase. More examples of commonalities include inclusion as waypoints on an interactive map (e.g., a user generated map with waypoints that denote places in Boston that serve calamari), and inclusion in a search history of a user's web search session.

Web pages or other documents can provide commonalities between different entities. Thus, additional examples of commonalities include similarities in what people are saying in web-based reviews and references, reviews by the same person, reviews by the same newspaper, references by the same web page, and links to web pages or other documents relating to different entities by the same web page. A food critic, for example, may author a web page that includes reviews of various restaurants. The food critic's web page can include a review of a first Italian restaurant and a review of a second Italian restaurant. A related entity search process can extract information from the food critic's web page to ascertain a commonality between the first and second restaurants, e.g., the same food critic reviewed both restaurants and/or used the same phrase in describing both restaurants. The related entity search process can analyze documents relating to the first Italian restaurant and documents relating to the second Italian restaurant to find additional commonalities (e.g., a large number of web-based users have written reviews on both restaurants or that both restaurants' web sites mention a happy hour).

Figure 2:
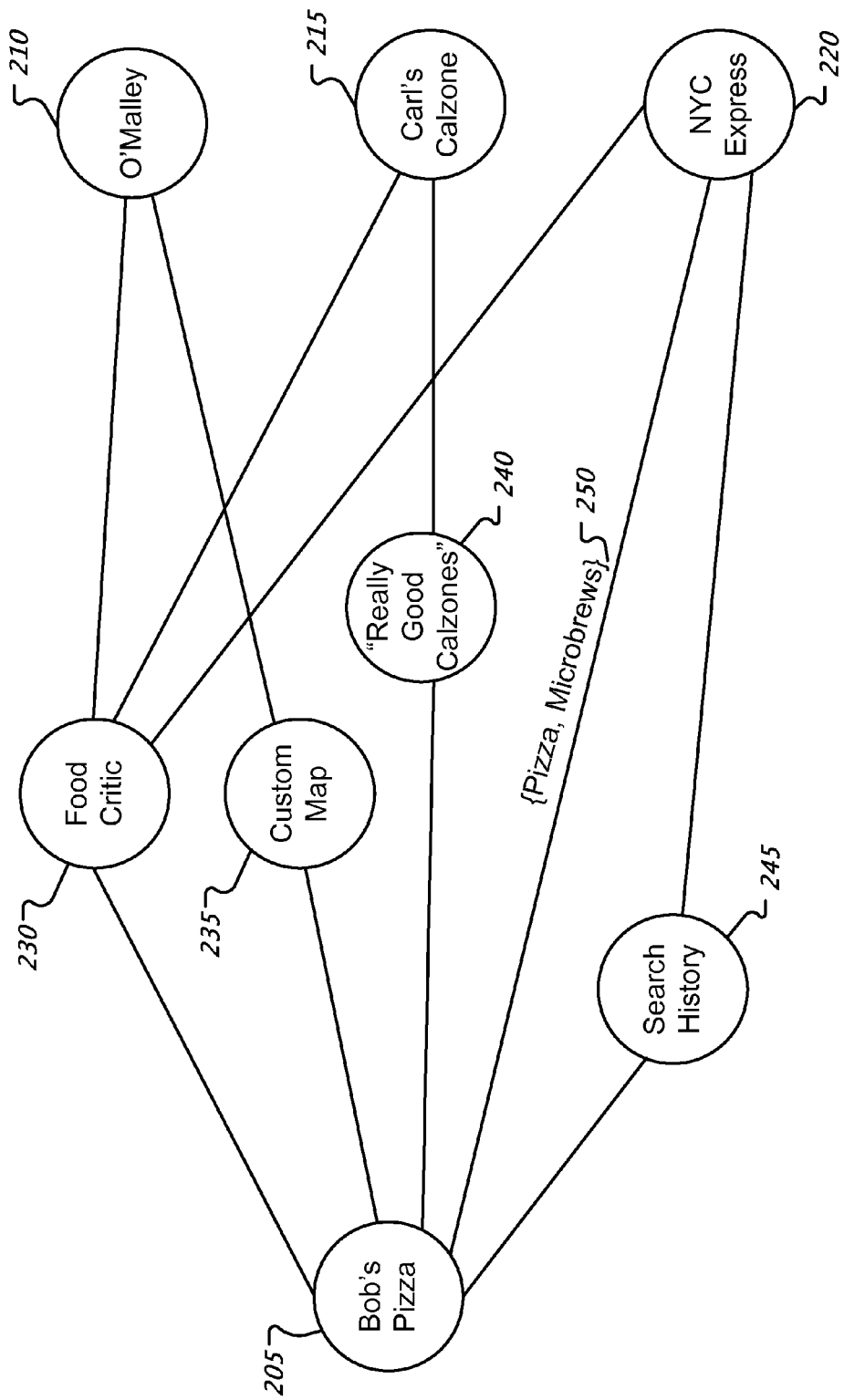
FIG. 2 shows examples of commonalities between different entities.

FIG. 2 shows examples of commonalities between different entities. In this example, a graph includes nodes 205, 210, 215, 220, 230, 235, 240, 245 with edges connecting the nodes. In this example, an entity node 205, 210, 215, 220 is a node that is associated with a specific entity. In this graph, "Bob's Pizza" node 205 is related to "O'Malley" node 210, "Carl's Calzone" node 215, and "NYC Express" node 220.

Commonalities between "Bob's Pizza" node 205 and "O'Malley" node 210 include reviews by the same food critic (e.g., represented as a commonality node 230 associated with a web site containing reviews of the food critic), and appearing as waypoints on the same custom map, e.g., commonality node 235. An example of a custom map includes a user generated map. Commonalities between "Bob's Pizza" node 205 and "Carl's Calzone" node 215 include reviews by the same food critic (e.g., commonality node 230) and the same sentiment phrase such as "really good calzones" (e.g., commonality node 240). Commonalities between "Bob's Pizza" node 205 and "NYC Express" node 220 include reviews by the same food critic (e.g., commonality node 230) and one or more appearances in a search history of a user (e.g., node 245) and sharing one or more characteristics, for example.

In some implementations, characteristics between nodes can be represented as an edge therebetween instead of as a node. For example, the web sites of "Bob's Pizza" node 205 and "NYC Express" node 220 both include characteristics such as descriptor words: "pizza" and "microbrews." Characteristics such as "pizza" and "microbrews" can be represented by one or more edges 250 between entity nodes 205, 220 that have these characteristics.

An application such as a web browser or a server process can generate a related entity search request. A search system can include one or more front-end servers to generate web-based search forms and to handle related entity search requests. The system can include one or more back-end servers configured to run a related entity search process to identify and rank candidate entities. In some implementations, a search system server can act as a front-end and back-end server.

A related entity search process can identify candidate entities. The search process can search for entities related to a target entity based on information stored in an index. For example, the search process can identify descriptors of commonalities previously extracted from the target entity's web site and search the index for other entities that have one or more of the extracted commonality descriptors. In another example, the search process can search the index to find web sites that mention the target entity. The search process can then identify other entities mentioned on those web sites and determine whether these other entities are related to the target entity. In some cases, as an example, an entry in a blog (e.g., a web log) can reference multiple entities, which may suggest a commonality therebetween.

A ranking process can generate relatedness scores for candidate entities identified by a related entity search process. For example, candidate entities can include all or a subset of entities that share at least a threshold number of commonalities with the target entity, and the ranking process can generate relatedness scores for candidate entities that are within a predetermined geographical distance from the target entity. The ranking process can compute a relatedness score based on the commonalities between a candidate entity and a target entity. As one example, a relatedness score for the candidate entity and the target entity can be calculated based on the number of commonalities that the two entities share. Thus, a large number of commonalities between two entities can yield a relatively large relatedness score indicating a stronger relationship between the entities.

The relatedness score can also be based on the type of commonalities. For example, different types of commonalities can be represented by different signals, where a signal is simply some type of data from which other information may be inferred. Some example signals can include: mentions on a particular type of web page or a particular web page; a category or attribute associated with the entity; mentions (e.g., as a waypoint) on a user-generated map of entities; mentions in a document or review by a particular author; identification as a search result, search term, or entity of interest in a browsing session; a term representing a feature that an entity is known for (e.g., a menu item or location); sentiment phrases associated with the entity; and identification within a hierarchical entity structure (e.g., places within a shopping center or other larger entity). The association of data from particular signal sources can be signals, and commonalities are then those signals that are shared between two entities. Alternatively, the signals can be the fact that two entities share a commonality (e.g., both mentioned on the same web page, both reviewed by the same reviewer, sharing a category, both mentioned on the same user-generated map).

In some implementations, the relatedness score can be based on a modified Jaccard index. For example, the Jaccard index (i.e., the size of the intersection of the samples sets associated with each entity divided by the union of the sample sets) can be multiplied by the logarithm of the size of the union of the sample sets and then weighted based on the number of signals connecting the entities:

$$EdgeSimilarity = \frac{\sum \left|\frac{A \cap B}{A \cup B}\right| \log(|A \cup B|) + |Signals|}{2|SignalTypes|}$$

where A and B are the size of the sample sets for the two entities, Signals is the number of signals indicating commonalities between the entities, and SignalTypes is the number of different signal types represented by the signals indicating commonalities. In some cases, the sample sets can be separated according to signal type (or other categorization) and thus, the Jaccard index multiplied by the logarithm of the size of the union can be summed across all signal types (or other categorization).

The calculation of the relatedness score for a target entity and a candidate entity can also involve weighting signals based on a signal weighting factor (e.g., a weight that is applied to signals of each signal type) and combining the weighted values to generate the relatedness score. The weightings can be determined, for example, using a linear regression analysis to determine the relative importance of different signals types to the relatedness of entities within a particular corpus or domain (e.g., for all entities or for a particular category of entities). The linear regression analysis can be performed based on a plurality of manual ratings (e.g., these two places are unrelated, are alternatives of each other, are supplements—e.g., a movie theater and a restaurant, are closely related—e.g., same cuisine, quality, and price range, etc.) for whether two entities are related and/or a degree or type of relatedness. These manual ratings can then be used in the following equation to calculate the signal weighting factors for each signal type:

$$W_0 * Score_0 + W_1 * Score_1 + \ldots + W_x * Score_x = [0,1],$$

where [0,1] is some value derived from the manual ratings (e.g., two places that are manually identified as very related are assigned a value closer to 1 and two places that are manually identified as unrelated are assigned a value closer to 0), $Score_x$ is the contribution to the relatedness score for the particular signal type as calculated using the modified Jaccard index described above, and $W_x$ is the weighting calculated using the linear regression analysis. The calculated weightings can then be used in subsequent calculations of relatedness scores to modify the contribution for each signal type to the overall relatedness score.

Once two (or more) entities are identified as related, a description of one or more commonalities can be identified (e.g., for use in describing one or more interesting aspects of the relationship). For example, one or more closely related entities, supplemental entities, and/or other related entities in the same geographic region as a target entity can be identified and potentially interesting terms or phrases that describe the basis for the relationship can be selected. In some implementations, weighted contributions of signals for each signal type can be used to identify one or more signal types that are particularly important for the relationship. For example, the signal types can be ranked according to their weighted contribution to the relatedness score (e.g., the signal type with the highest weighted contribution may be selected as the most important to the relationship), and the top one or two signal types can be identified for use in selecting signals from which to select a description of the relationship.

One or more signals from the various signals for each identified signal type can be selected for use in identifying interesting descriptions of commonalities between two or more related entities. Signals from more than one signal type can also be used to, for example, generate orthogonal descriptions of the relationship (i.e., terms or phrases that pertain to unrelated features, e.g., "beer on tap and outdoor seating"). For example, each of the orthogonal descriptions can be selected based on signals of different signal types. Signals can also be used to describe how two or more related entities are different (e.g., "similar to Joe's pizza, but fancier and has outdoor seating"). Signals can also be selected across all signal types instead of limiting the candidate signals to a particular signal type. To select a particular signal from the various signals, it may be desirable to avoid selecting signals that are too common (e.g., a broad category, such as "restaurant") or too rare (e.g., a one of a kind product or menu item). Rather, a more interesting description of the relationship may be obtained by selecting a signal representing a commonality that is closer to the middle in terms of frequency of occurrence. In other words, a uniqueness of each signal (e.g., using a uniqueness score that is tied to the frequency of occurrence) can be determined and uniqueness scores near the mid-point of the uniqueness value distribution can be used to select a potentially interesting signal. As an example, all of the signals for the signal type (e.g., for all entities or for all signals that are associated with the target entity) can be ranked according to the total number of entities each signal is associated with (e.g., signal 1 is associated with 6154 entities, signal 2 is associated with 5434 entities, . . . , and signal x is associated with 2 entities), and the average (or the median) number of signals can be identified (e.g., (6154+5434+ . . . +2)/x). A signal associated with the target entity that is close to the average or median (e.g., within a standard deviation of the average or median) can be selected as an interesting signal, and a description of the commonality associated with the selected signal can be identified as a description of the relationship. Selecting signals within a standard deviation of the average or median serves to provide upper and lower thresholds for uniqueness. Other thresholds for uniqueness can also be used. Moreover, signals with a uniqueness threshold closer to or farther from the average or median can be favored in various implementations. Other criteria can also be used for the selection of signals (e.g., to avoid the use of certain blacklisted terms, inverse document frequency criteria, to avoid selecting commonality descriptions that do not have nearby entity locations, to select terms of likely interest to a particular user based on information in a user profile, etc.). As one example, descriptions based on the signals can be selected and personalized according to information associated with the particular user (e.g., two places may be identified as related for a particular user because both are mentioned in the New York Times, which the particular user may have demonstrated an interest in based on search history; or a signal may indicate that a source of information that a particular user is interested in has reviewed two particular places, and thus may be of more interest to the particular user).

A display process can generate a search results web page with result information in response to a search query, and the results web page can include descriptions of commonalities that a target entity (e.g., an entity listed in the search results) shares with other entities (i.e., to encourage exploring other places that are similar) and/or can include the names of entities related to a target entity.

Figure 3:
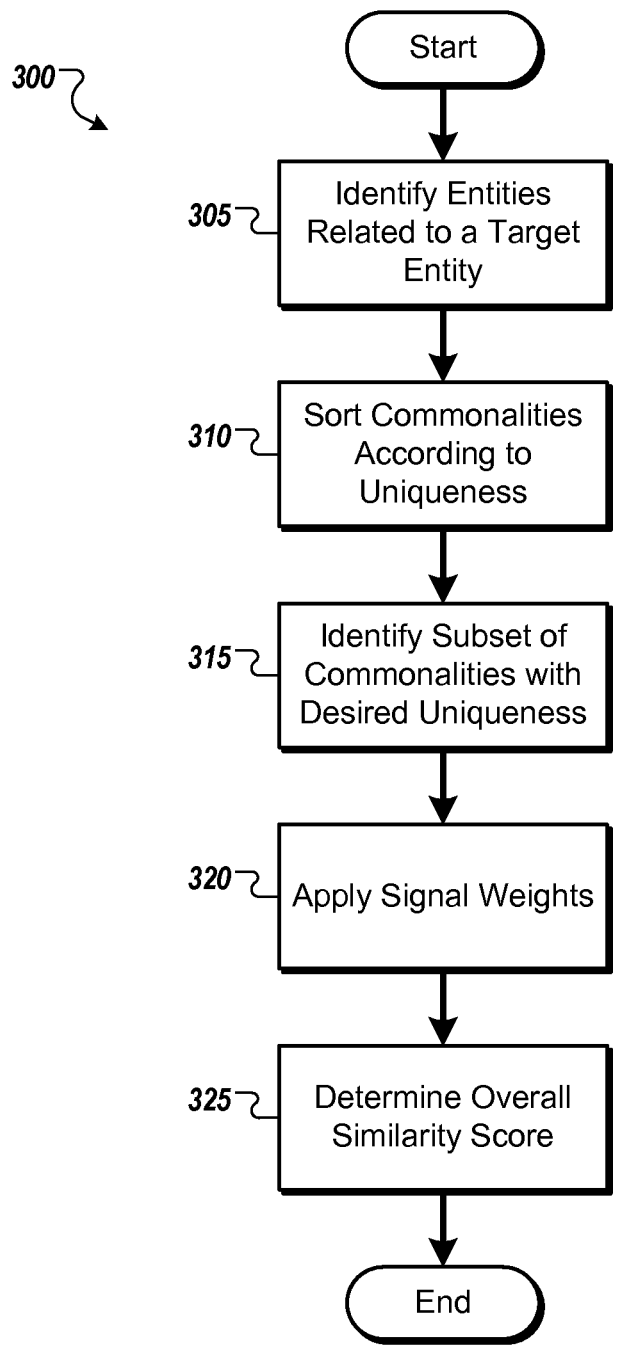
FIG. 3 is a flow diagram of a process for generating descriptions of a commonality between different entities.

FIG. 3 is a flow diagram of a process 300 for generating descriptions of a commonality between different entities. Initially, one or more related entities for a particular target entity are identified (305). The related entities are identified based on commonalities between the target entity and each of the related entities. For example, the related entities can be identified based on the relatedness scores described above. The commonalities are sorted (310) according to a measure of uniqueness of each of the plurality of commonalities. For example, the commonalities can be sorted according to the number of appearances of each commonality in a corpus. A subset of the commonalities having a desired measure of uniqueness is identified (315). For example, commonalities have a measure of uniqueness above a lower uniqueness threshold can be included in the subset (e.g., to rule out commonalities that frequently occur and thus do not reveal particularly interesting insight into a relationship between entities). An upper threshold may also be applied (i.e., to avoid selecting very infrequent commonalities, which may not be of particular interest). It is noted that the categorization of upper and lower thresholds can depend on whether the measure is of uniqueness or of frequency of occurrence, which are generally inverses of one another. One or more of the commonalities are selected from the subset as indicative of the relationship between the target entity and one or more related entities (320). A description of the relationship is then identified based on the selected commonality (325). For example, the commonality may be a term or phrase that is selected as the description, or the term or phrase may be modified to change tenses, remove or add words (e.g., for a commonality that results from two entities both having the category of "Thai restaurant," the description may be identified as "other Thai restaurants"), or change between singular and plural. In some cases, the commonality may result from two entities appearing on the same or similar resources, in which case the description may be identified as some type of description of the resources or the subject matter of the resources.

Figure 4:
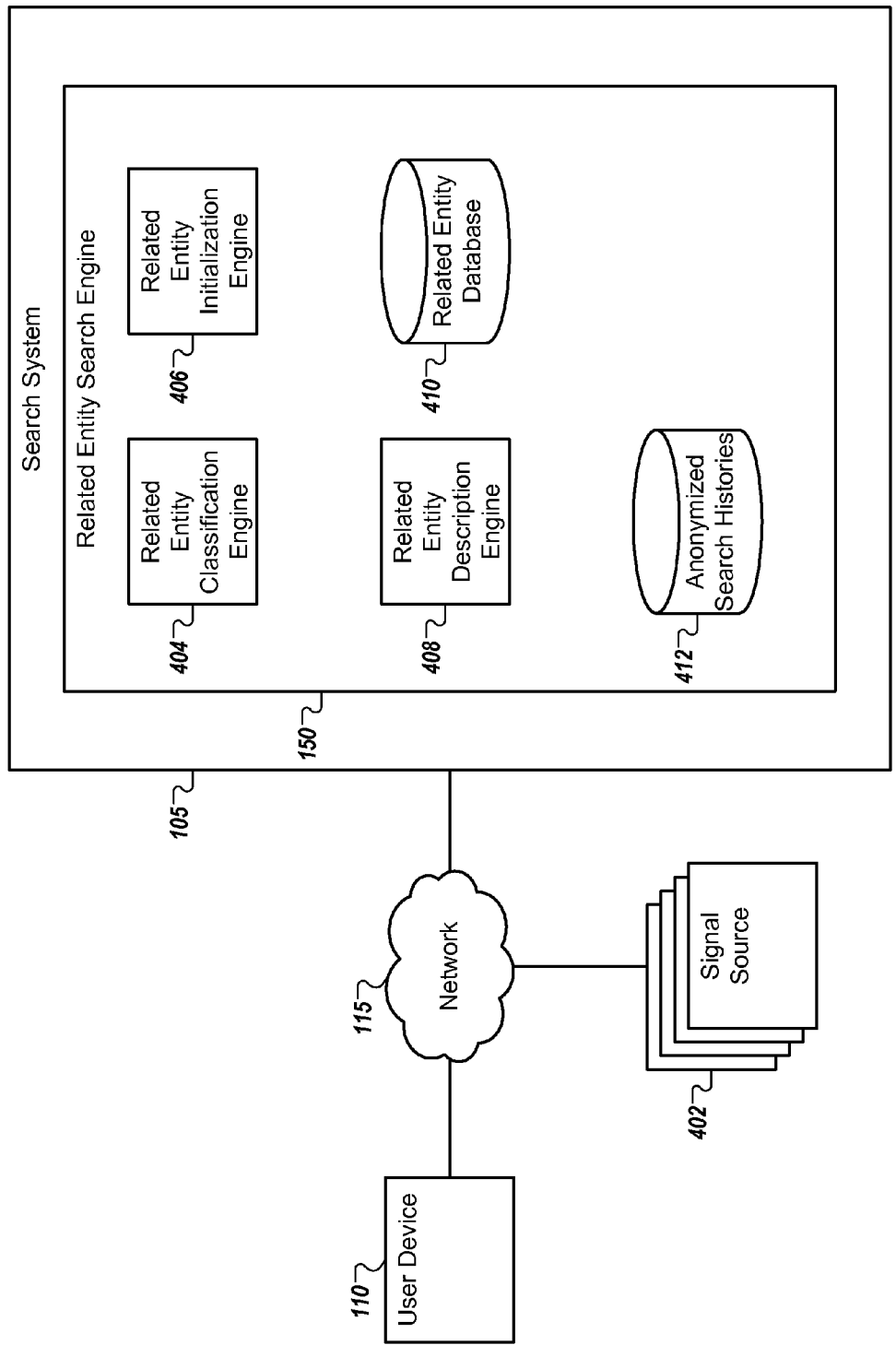
FIG. 4 is an example of a related entity search engine.

FIG. 4 is an example of a related entity search engine 150. As previously described, the entity search engine 150 may be configured to find entities that are related to an entity specified in a search query.

Signal sources 402 are sources of documents available for indexing by the index 130 that can indicate a relationship between entities or that can contain information from which a relationship between entities can be inferred (e.g., common or similar descriptions or categorizations). Example signal sources 402 can include web pages, databases that identify category information for entities, databases that identify features that particular entities are known for, collections of reviews for entities, maps that identify particular entities, search histories, sentiment analyses of entities, etc.

A related entity classification engine 404 can process information about entities to identify relationships among the entities. For example, the related entity classification engine 404 can use a commonalities graph, such as that shown in FIG. 2, and the modified Jaccard index described above to identify related entities and to rank the degree of relatedness. The related entity classification engine 404 can access the index 130 to identify related entities. As the index 130 updates, the related entity classification engine 404 can, periodically or as resources are available, modify and update the determination or related entities. Alternatively or additionally, the related entity classification engine 404 can identify related entities in response to a request from, from example, the search engine 105.

A related entity initialization engine 406 can be used, for example, to determine which signal types are important for identifying relationships among entities (e.g., of a particular entity type) and can generate weightings for different signal types using the regression analysis described above. The results produced by the related entity initialization engine 406 can be used by the related entity classification engine 404 to calculate similarity or relatedness scores for various entities. The results can also be used in identifying signal types that are important for describing commonalities between a target entity and one or more related entities.

A related entity description engine 408 can be used by the related entity classification engine 404 to identify terms that, for example, describe a relationship between two or more entities. For example, the related entity classification engine 404 may determine that a map identifies two entities and may pass a title or other description of the map to the related entity description engine 408. The related entity description engine 408 can identify terms from the map to use as commonalities between the two entities. Based on all of the terms collected for the target entity, the related entity description engine 408 can identify terms that describe an interesting relationship that the target entity has with one or more related entities (e.g., using the uniqueness scores and thresholds described above).

The related entity databases 410 can store identifications of related entities, although, in some implementations, the related entity database 410 is not necessary. For example, if the related entity classification engine 404 is configured to dynamically identify related entities in response to search requests, identifications of related entities may not need to be stored.

Anonymized search histories 412 can store information about prior search activities. For example, the behavior of users when presented with a number of similar entities may be recorded for future refinement. In some implementations, the anonymized search histories 412 may be used as a signal source 402.

Figure 5:
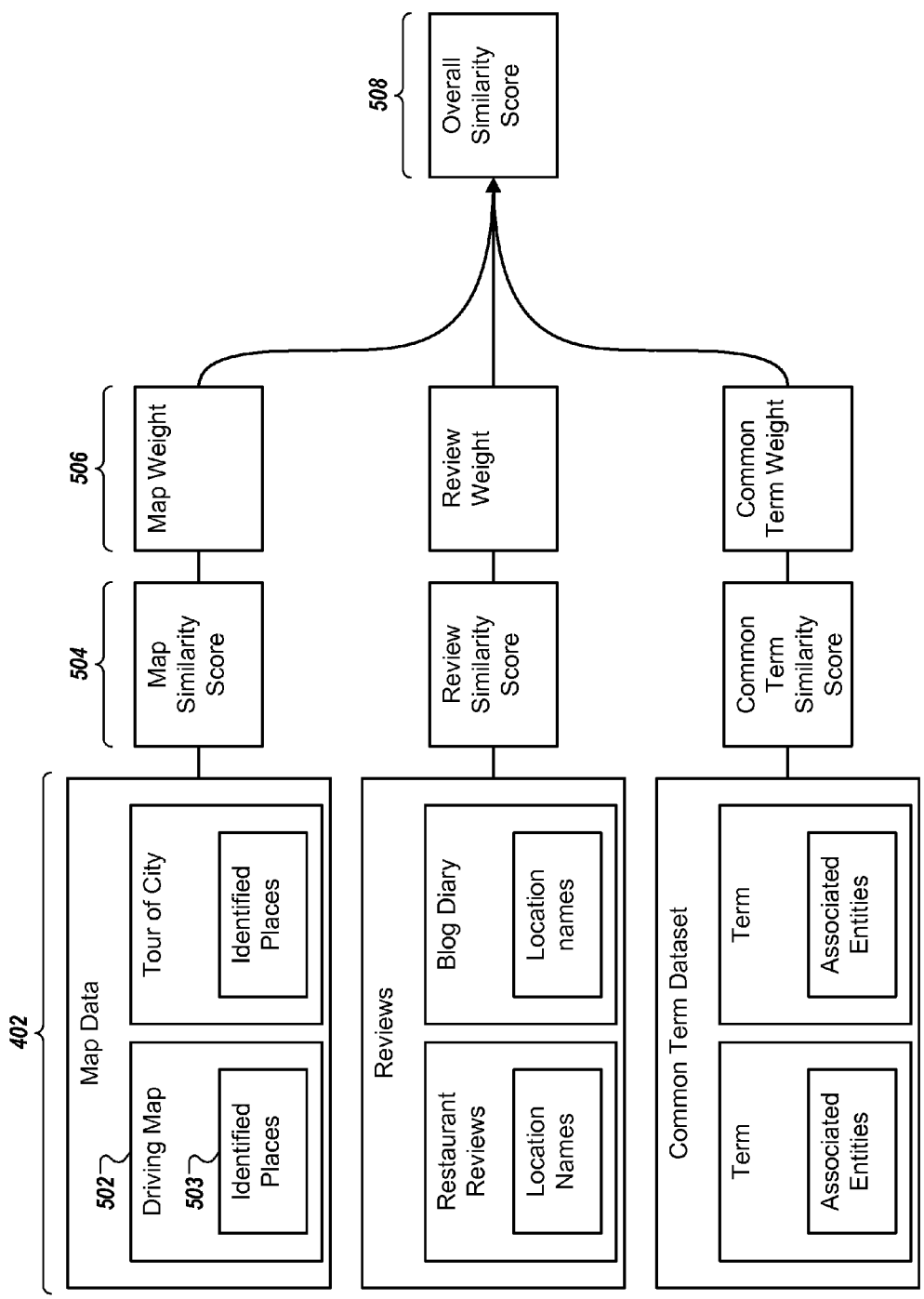
FIG. 5 shows examples of data used to calculate similarity scores.

FIG. 5 shows examples of data used to calculate similarity scores. In some implementations, the data shown may be collected, generated and used by, for example, the related entity classification engine 404 and the related entity initialization engine 406. For descriptive purposes, the system shown in FIG. 4 will be used to describe the data, but it will be understood that other system may collect, generate and use the data.

Signal sources 402 can include documents 502, which in turn contain terms 503. In some implementations, the terms 503 may be candidates for commonalities between two entities. Three types of single sources 402 are shown in FIG. 5, but more, fewer, and different types of signal sources are possible. As additional examples, signals can be derived from: map data (e.g., user-created maps and driving direction archives), which may include terms such as map names, location names, and terms used in map descriptions; reviews or content written by the same author or appearing in the same publication (e.g., restaurant reviews or blog postings), which may include terms such as menu items, sentiment terms, descriptions of services, features, chefs, etc.; frequently used term datasets (e.g., term lists), which may include terms for which an entity might be known; web browsing histories (e.g., web browsing session data), which may identify web pages viewed in the same browsing session or terms used to search for particular entities; and categorization data (e.g., structured data identifying categories), which may include category designations for particular entities.

The related entity initialization engine 406 can use documents 502 from the signal sources 402 to generate an initial similarity score 504 for each signal source 402. The initial similarity score for each pair of entities can be based, at least in part, on the number of documents 502 from the signal source 402 that contain references to or that otherwise relate to each of the entities in the pair. For example, the initial similarity score can be generated using the modified Jaccard index discussed above.

The related entity initialization engine 406 can then determine a signal weight 506 for each signal source 402 using a regression analysis based on known or manually generated overall similarity information between various pairs of entities. The signal weight 506 can be a measure of the signal source 402 contribution to relatedness for a particular type of entity. For example, it may be determined that map data is more important or descriptive for a class of entity than reviews, in which case the map weight 506 would be greater than the review weight 506.

Subsequently, the related entity classification engine 404 can calculate similarity scores by signal source 402 and weight each similarity score 504 with the associated weight 506 determined by the related entity initialization engine 406 and combine the weighted similarity scores 504 to determine an overall similarity score 508. The overall similarity score 508 can thus provide a measure of how related two entities are with each other. The related entity classification engine 404 can select, for a particular entity, other entities as similar by ranking the similarity scores 508 between the particular entity and other entities.

Figure 6:
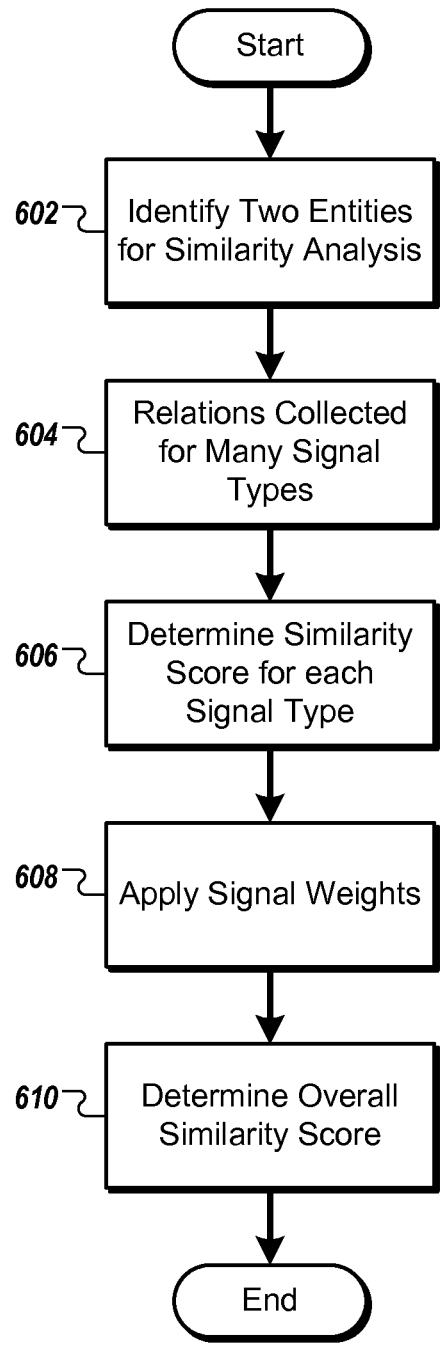
FIG. 6 shows an example process for calculating similarity scores.

FIG. 6 shows an example process for calculating similarity scores. In some implementations, the process shown may be performed by, for example, the related entity classification engine 404 using the data shown in FIG. 5. For descriptive purposes, the system shown in FIG. 4 and data shown in FIG. 5 will be used to describe the process, but it will be understood that other system and/or data may be used.

Two entities are selected for similarity analysis (602). For example, the related entity classification engine 404 may identify a new document in the index 130 that identifies two entities. In another example, the related entity classification engine 404 may receive a request from a system such as the search system 105 to identify entities similar to a target entity and may calculate similarity scores between the target entity and numerous other entities in the vicinity of the target entity.

Signals are collected for the two entities from many signal types (604). For example, the related entity classification engine 404 can identify signals for each signal source 402 that are associated with either or both entities identified for analysis. For example, for map dataset signal sources 402, the related entity classification engine 404 may identify data relating to any map having both entities listed as waypoints.

For restaurant review signal sources 402, the related entity classification engine 404 may identify review documents 502 that list either of the entities, and the related entity classification engine 404 may pair two reviews written by the same author.

Similarity scores are determined for each of the signal types (606). For example, the similarity score may be the modified Jaccard index value described above.

Signal weights are applied to the similarity scores for each signal type (608). For example, the related entity classification engine 404 can weight the similarity scores 504 according to the weights 506 generated by the related entity initialization engine 406. As described above, the weights 506 can be calculated by use of a linear regression using each similarity score 504 as constants and the weights 506 as independent variables. For an example in which signals are grouped by signal type according to map data signal sources 402, reviews signal sources 402, and common terms dataset signal sources 402, the following equation can be used in a linear regression to find a map weight 506, a review weight 506, and a common term weight 506.

mapWeight*mapSimScore+ reviewsWeight*reviewsSimScore+ commonWeight*commonSimScore=[0,1] where [0,1] is some value derived from a predetermined weighting of how similar the two entities are.

For example, the two entities are very similar (both restaurants), the value may be 1. If they are very different (a restaurant and a car wash), the value may be close to 0.

The overall similarity score is determined for the two entities (610). For example, the related entity initialization engine 406 can multiply the weights 506 with the associated similarity scores 504 and add the results together to determine an overall similarity score 508 for the two entities, and the related entity initialization engine 406 can return the overall similarity score 508 to the related entity classification engine 406.

FIG. 7 shows an example of data used to select commonalities. In some implementations, the data shown may be collected, generated, and used by, for example, the related entity classification engine 404 and the related entity description engine 408. For descriptive purposes, the system shown in FIG. 4 will be used to describe the data, but it will be understood that other systems may collect, generate, and use the data.

Commonality terms 702 can be extracted from the documents 502 by the related entity classification engine 404. The particular source of the commonality terms 702 may depend on the type of signal source 402 from which the document 502 is received. For example, for a map document 502, the title of the map or user annotations may be used as commonality terms 702. For entity reviews, the inverse document frequency of every word may be determined, and any term found with an inverse document frequency above a threshold may be used.

A uniqueness value 704 may be generated by the related entity description engine 408 for each commonality term 702. In some implementations, the uniqueness score may be related to the number of other entities that share the commonality term 702. For example, if very few other entities share the commonality term 702 "Coat Rack", then the coat rack commonality term 702 may have a very high uniqueness value 704.

In some implementations, the uniqueness value may be a measure of how unique a particular similarity term 702 is in a corpus of documents 502 from a single signal type. For example, for similarity terms 702 from a corpus of restaurant review documents 502 from a particular review author, the term "pizza" may be found in many reviews and the term "coat rack" may be found very few times. In such a case, the "pizza" similarity term 702 may have a low uniqueness value 704, and the "coat rack" similarity term 702 may a high uniqueness term.

The related entity description engine 408 may calculate uniqueness selection parameters 706. The uniqueness selection parameters 706 can identify a subset of the commonality terms 702 to be identified as commonalities between two entities. In some examples, the list of commonality terms 702 may include a greater number of commonality terms 702 than can be usefully employed for some applications. Some commonality terms 702 (e.g., those with a high or low uniqueness score 704) may be deemed undesired. The uniqueness selection parameters 706 can be used, for example, to identify the commonality terms 702 with a uniqueness score 704 within one standard deviation of the mean of the uniqueness scores 704. The selected commonality terms 708 can be sent from the related entity description engine 408 to the related entity classification engine 404 for use in, for example, responding to queries. The uniqueness selection parameters 706 may also systematically or randomly select a subset of the commonality terms 702 as the selected commonality terms 708. User interactions with applications displaying the selected commonality terms 708 can be obtained from the anonymized search histories 412. The related entity description engine 408 can use the aggregated, anonymized search histories 412 and use selected commonality terms 708 that achieve some goal, for example most user interaction or click-throughs. As another alternative, the uniqueness selection parameters 706 can be based on commonalities of potential interest to a user. For example, if a user indicates an interest in a particular reviewer or website, commonalities from those sources may be selected or favored. In this scheme, the commonality terms 702 may be from multiple signal types, for example, to more closely correspond to the user's interests.

Figure 8:
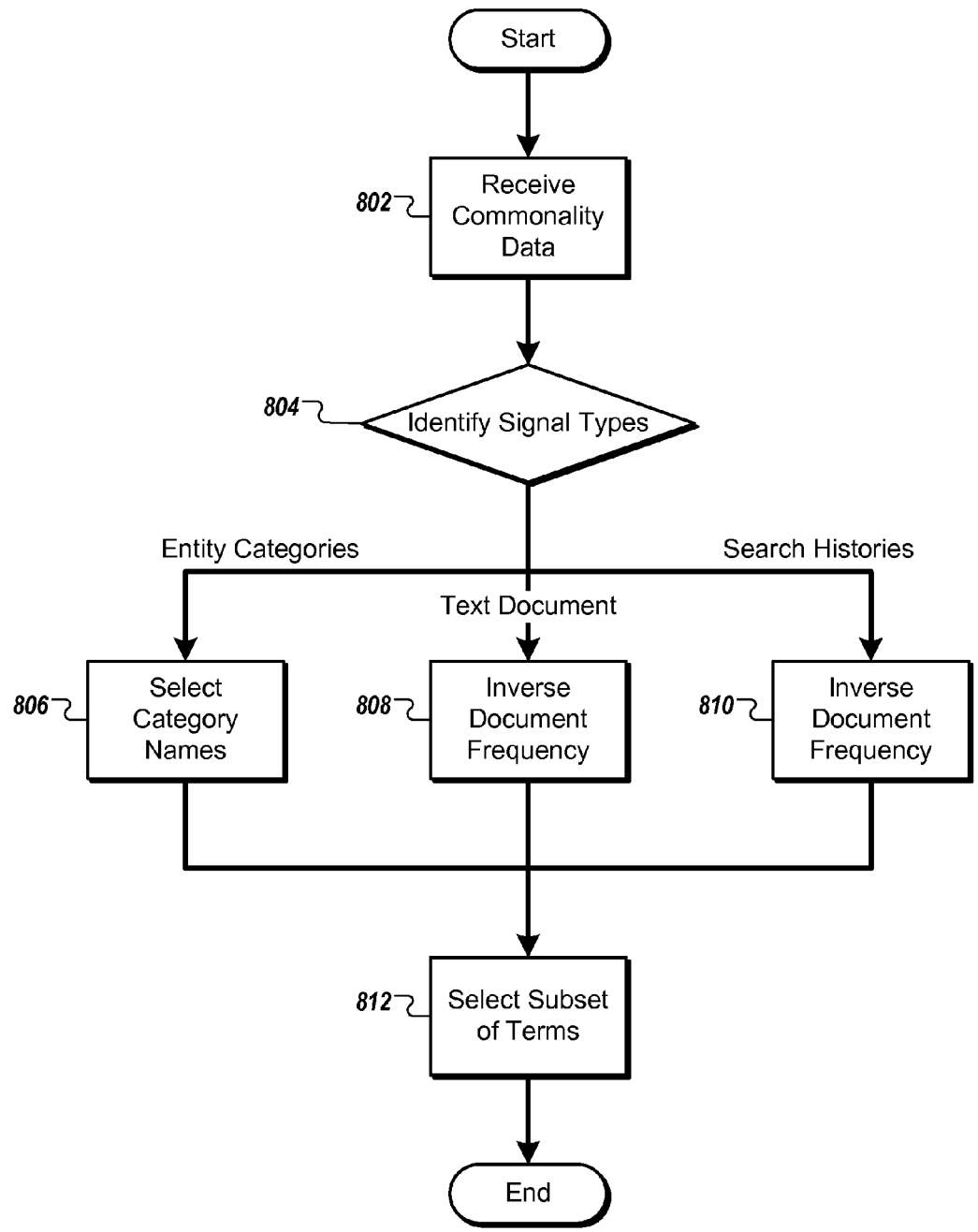
FIG. 8 shows an example process for selecting commonality terms.

FIG. 8 shows an example process for selecting commonality terms. In some implementations, the process shown may be performed by, for example, the related entity classification engine 404 and the related entity description engine 408 using the data shown in FIG. 7. For descriptive purposes, the system shown in FIG. 4 and data shown in FIG. 7 will be used to describe the process, but it will be understood that other system and/or data may be used.

Data indicating potential commonalities between entities is received (802). For example, the related entity classification engine 404 can send, to the related entity description engine 408, a collection of documents 502 (or index data extracted from the documents 502) that are associated with two entities. In some implementations, the collection of documents 502 may be all documents having a particular signal type with the highest weight 506 or the greatest weighted contribution to the overall similarity score 508. As an alternative, the signal types can be ordered by weight 506 or weighted contribution to the overall similarity score 508. Then, one or more signal types may be selected based on that ranking, for example, by selecting any signal type with a weight 506 or weighted contribution above a threshold value or selecting the N signal types with the highest weights 506 or weighted contributions.

The signal type of the commonalities data is identified (804) for use in selecting a type of processing. For example, the structure and nature of signals for each signal type may be such that the related entity description engine 408 may parse signals from different types of signal sources 402 differently.

Described here are three different parsing schemes for three categories of documents 502, but other number and types of schemes are possible.

One possible signal type includes signals from entity categories. In this case, category names may be extracted (806) and identified as commonality terms 702. A uniqueness value 704 can be determined by, for example, determining the number of entities in a particular category compared to the number of entities in other possible categories. Another possible signal type includes signals from text documents. In this case, an inverse document frequency can be calculated for terms in the text documents (808). For example, reviews, written content, and general webpage text can be considered text documents by the related entity description engine 408. For each term 503 in the document 502, the related entity description engine 408 can calculate the term's 503 inverse document frequency, and use the terms 503 as commonality terms 702. Another possible signal type includes signals from a search history. In this case, terms found in the search history can be extracted as potential commonality terms (810). For example, the related entity description engine 408 may parse the search history using an inverse document frequency analysis for terms that are not blacklisted (e.g., terms that lack descriptiveness), and use those terms as the commonality terms 702.

A subset of the commonality terms is selected (812). For example, the related entity description engine 408 can identify one or more commonality terms 702 that have uniqueness values 704 within one standard deviation of the mean of all uniqueness values 704 as the one or more selected commonality terms 708. In other implementations, the commonality terms 702 with the median uniqueness value 704 and the surrounding N commonality terms 702 may be selected as the selected commonality terms 708. The related entity description engine 408 can return the selected commonality terms 708 to the related entity classification engine 404 for use, for example, in a graphical user interface.

Figure 9:
FIG. 9 shows an example graphical user interface displaying commonality terms.

FIG. 9 shows an example graphical user interface displaying commonality terms. For example, the GUI may be incorporated as part of a web page displayed to a user in response to a search query for "Papa Santo's." In this example, the web page includes information about entities that are similar to Papa Santo's, sorted by commonality 902. Here, four entities (Pizza Roma, Angelo's Lounge, Napolitano's, and Mainstay Pizza) are similar to Papa Santo's and have the commonality "Wood-Fired Oven." Each commonality 902 is presented as an expandable menu item, which can allow the user of the GUI to quickly find or explore alternative entities based on a feature of Papa Santo's they are interested in.

Figure 10:
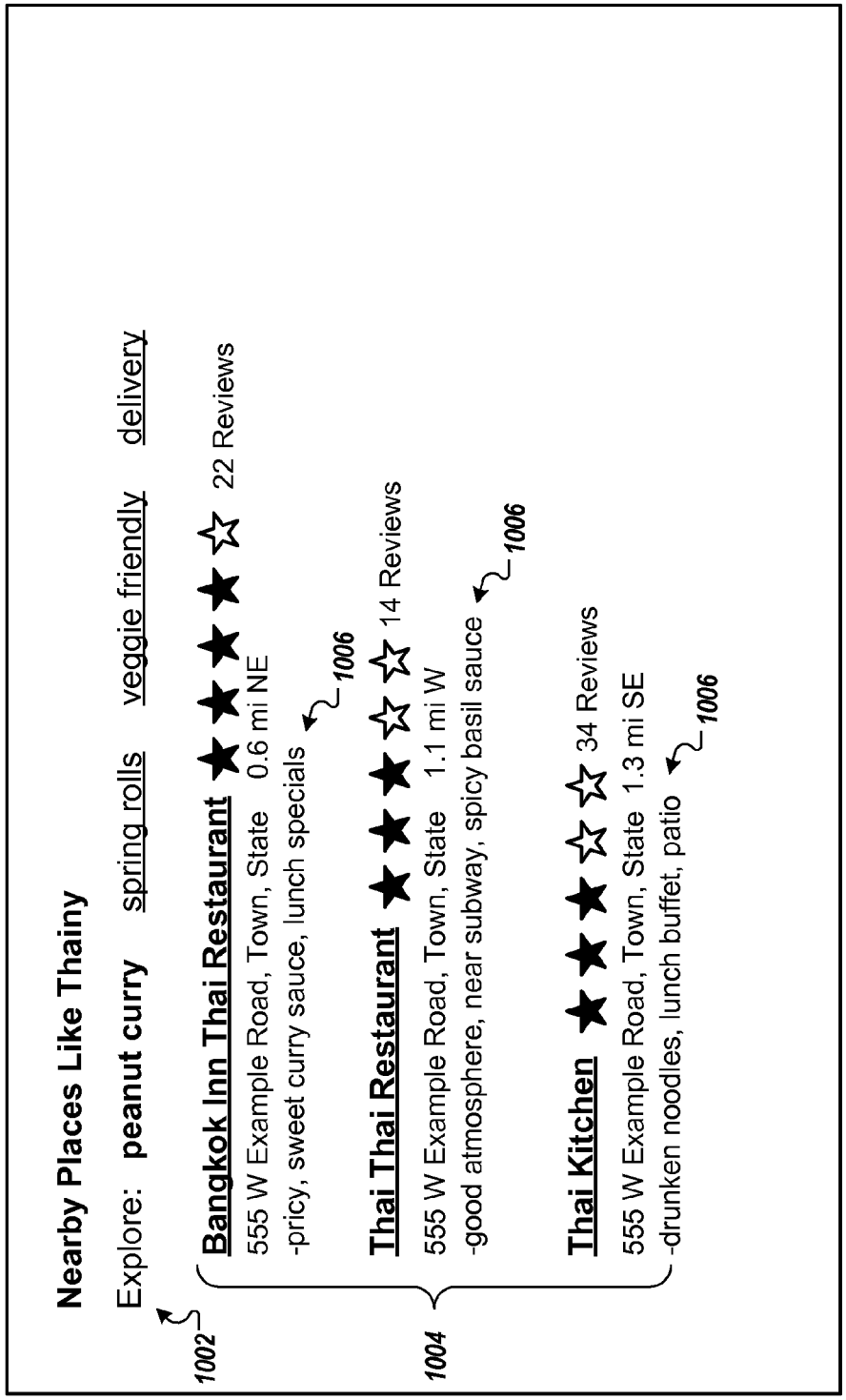
FIG. 10 shows an alternative example graphical user interface for exploring nearby places based on commonality terms.

FIG. 10 shows an alternative example graphical user interface for exploring nearby places based on commonality terms. For example, the GUI may be incorporated as part of a web page displayed to a user in response to the user selecting a "other similar nearby places" link on a page that displays information about a target entity—in this example, a restaurant called "Thainy." In this example, the web page includes links (at 1002) that allow a user to explore information about nearby places (i.e., candidate entities) that share potentially interesting commonalities (e.g., "peanut curry," "spring rolls," "veggie friendly," and "delivery"). In the illustrated example, a user has selected the "peanut curry" option in response to which the web page displays a list 1004 of entities that share "peanut curry" as a commonality with Thainy. The list 1004 can include information about the related entities (e.g., name, ratings, address, web page link, distance from the current target entity, etc.). In addition, list 1004 can include additional terms (at 1006) that are potentially interesting regarding each candidate entity. The additional terms can be commonalities that each candidate entity shares with the target entity, commonalities that each candidate entity shares with other entities, or terms that are associated with the candidate entity without regard to whether they represent commonalities with other entities. In some cases, the additional terms can include terms that distinguish the candidate entity from the target entity. For example, the additional terms can represent interesting commonalities that the candidate entity shares with other entities but that are not shared with the target entity. Such commonalities that the candidate entity shares with other entities can be identified, for example, using the techniques described above (e.g., in connection with FIG. 8), but the commonality terms can be filtered to remove commonalities that the candidate entity shares with the target entity. In some implementations, the additional terms 1006 can be selected to include both commonalities that the candidate entity shares with the target entity and terms that distinguish the candidate entity from the target entity.

Although the examples set forth in FIGS. 9 and 10 include commonalities among different restaurants in the same general vicinity, the techniques can also be used to present users with commonality information for other types of entities. For example, commonalities can be presented for other types of places (e.g., businesses, parks, attractions, etc.), organizations (e.g., clubs or entities that govern or provide information about a sport or other activity), people (e.g., celebrities or government representatives), fictional characters, media (e.g., books or movies), or any other type of entity. In addition, in some implementations, commonalities can be presented among entities without regard for whether the entities are located near one another or for whether the entities have a physical location. For example, presenting commonalities between people, or between businesses that have multiple locations or that do not have storefront presences, may not rely on physical location. In this regard, other types of categorizations (e.g., a profession of a person or business type of a business) may be used for identifying candidate entities having commonalities with a target entity that users may find interesting.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    identifying one or more related entities for a particular entity based at least in part on (A) a plurality of commonalities between the particular entity and the one or more related entities and (B) a plurality of categories of potential commonalities, with each category of potential commonalities including a respective plurality of commonalities between the particular entity and one or more related entities, comprising:
        sorting the plurality of commonalities according to a measure of uniqueness of each of the plurality of commonalities;
        selecting a particular category of potential commonalities, wherein the plurality of commonalities includes the respective plurality of commonalities for the particular category of potential commonalities, including:
            ranking the plurality of categories of potential commonalities according to a contribution of the respective plurality of commonalities for each category of potential commonalities to a relatedness of the one or more related entities to the particular entity; and
            selecting the particular category of potential commonalities based on the ranking;
    identifying a subset of the sorted plurality of commonalities having a measure of uniqueness above a lower measure of uniqueness threshold, wherein the identified subset of commonalities includes one or more commonalities;
    selecting one or more commonalities from the subset of commonalities as indicative of a relationship to the particular entity; and
    identifying a description of the relationship based on the selected one or more commonalities.

2. The method of claim 1 wherein ranking the plurality of categories of potential commonalities according to the contribution of the respective plurality of commonalities to the relatedness of the one or more related entities to the particular entity includes weighting each category of potential commonalities according to predetermined category weights.

3. The method of claim 2 wherein the predetermined category weights are determined by:
    receiving ratings of a relatedness of entities;
    calculating a plurality of similarity scores for the entities, with each similarity score corresponding to each of the plurality of categories of potential commonalities; and
    performing a linear regression analysis using the plurality of similarity scores and the ratings of the relatedness of the entities to calculate the category weights.

4. The method of claim 1 wherein the measure of uniqueness of each of the plurality of commonalities includes a quantity of related entities that share a commonality in the plurality of commonalities.

5. The method of claim 4 wherein identifying a subset of the sorted plurality of commonalities includes:
    calculating an average measure of uniqueness for the sorted plurality of commonalities; and
    identifying a commonality having a measure of uniqueness within about a standard deviation of the average measure of uniqueness.

6. The method of claim 1 wherein the measure of uniqueness of each of the plurality of commonalities relates to a frequency of description of the commonality in a corpus of resources.

7. The method of claim 1 wherein selecting one or more commonalities from the subset of commonalities as indicative of a relationship to the particular entity includes at least one of:
    identifying commonalities of potential interest to a user;
    identifying commonalities associated with trusted information sources; or
    selecting a plurality of commonalities, with each selected commonality corresponding to a different category of potential commonalities.

8. The method of claim 1 wherein the plurality of commonalities is selected for a user based on prior interactions by the user.

9. The method of claim 1 wherein identifying a description of the relationship based on the selected one or more commonalities includes identifying text associated with the selected one or more commonalities.

10. The method of claim 1 further comprising displaying the description of the relationship in a user interface in association with an identifier of the particular entity.

11. The method of claim 1 wherein the plurality of commonalities are selected from one or more categories of potential commonalities including:
    references to the particular entity and one or more related entities in a common web page;
    references to the particular entity and one or more related entities by a particular content author;
    identification of the particular entity and one or more related entities in a common web browsing session;
    one or more common categories associated with the particular entity and one or more related entities;
    one or more common attributes associated with the particular entity and one or more related entities;
    one or more common terms identified as representative of the particular entity and one or more related entities;
    an association of the particular entity and one or more related entities within a hierarchical entity structure;
    common sentiment phrases extracted from documents associated with the particular entity and documents associated with one or more related entities;
    an association of a waypoint for the particular entity and waypoints for one or more related entities with a user-defined map; or
    an identification of a web page associated with the particular entity and webpages associated with the one or more related entities as similar web pages.

12. The method of claim 1, further comprising: obtaining a user-provided search query that identifies the particular entity; and responsive to the user-provided search query: presenting, to a user, information identifying (i) a related entity in the one or more related entities and (ii) a description of a relationship between the related entity and the particular entity.

13. The method of claim 12 wherein an entity is one of a place, a business, a geographical location, an organizations, or a person.

14. A non-transitory computer storage medium encoded with a computer program, the program comprising instructions that when executed by data processing apparatus cause the data processing apparatus to perform operations including:
receiving an identification of one or more related entities for a particular entity, wherein the related entities are identified based at least in part on a plurality of commonalities between the particular entity and the one or more related entities;
determining a relative contribution for each of a plurality of categories of commonalities to a level of relatedness between the particular entity and the one or more related entities;
eliminating at least a portion of the plurality of commonalities to generate a subset of commonalities based, at least in part, on (A) a frequency of occurrence of the commonalities in a corpus of resources above a threshold frequency level and (B) a relatively low contribution of one or more categories of commonalities to the level of relatedness;
selecting one or more commonalities from the subset of commonalities as indicative of a relationship to the particular entity; and
identifying a description of the relationship based on the selected one or more commonalities.

15. The computer storage medium of claim 14 wherein the threshold frequency level is based on an average frequency of occurrence of the plurality of commonalities.

16. The computer storage medium of claim 14 wherein selecting one or more commonalities from the subset of commonalities as indicative of a relationship to the particular entity is performed for a particular user based at least in part on data identifying prior interactions by the user with one or more web documents.

17. The computer storage medium of claim 14 wherein the operations further including: obtaining a user-provided search query that identifies the particular entity; and responsive to the user-provided search query: presenting, to a user, information identifying (i) a related entity in the one or more related entities and (ii) a description of a relationship between the related entity and the particular entity.

18. The system of claim 17 wherein an entity is one of a place, a business, a geographical location, an organizations, or a person.

19. A system comprising:
one or more related entity identification servers adapted to identify related entities based on a plurality of commonalities between a first entity and a second entity;
one or more processing servers adapted to identify descriptions of relationships between related entities based on one or more candidate commonalities by:
identifying one of a plurality of categories of commonalities as providing a greater relative contribution to a relatedness of the first entity and the second entity based on a weighted similarity score for each of the plurality of categories of commonalities, wherein the weighted similarity score for each category of commonalities is based on a combination of a similarity score calculated using commonalities in the category of commonalities and a weighting corresponding to a predetermined level of contribution of the category of commonalities to the relatedness of related entities;
eliminating a subset of the commonalities from the plurality of commonalities as candidate commonalities based on an insufficient level of uniqueness of the commonalities in the subset of commonalities;
selecting one or more of the commonalities that remain after eliminating a subset of the commonalities as indicative of a basis for a relationship between the first entity and the second entity; and
identifying a description of the relationship between the first entity and the second entity based on the one or more selected commonalities.

20. The system of claim 19 wherein the one or more related entity identification servers adapted to identify related entities by calculating a Jaccard index for the first entity and the second entity.

21. The system of claim 19 further comprising one or more initialization servers adapted to:
receive ratings indicating a level of relatedness of a sample set of entities;
calculate a similarity score for each pair of entities in the sample set of entities, wherein each similarity score corresponds to a different one of the plurality of categories of commonalities and the similarity score is calculated using commonalities for the pair of entities in the corresponding category of commonalities; and
perform a linear regression analysis to calculate the weighting for each category of commonalities based on the received ratings and the calculated similarity scores.

22. The system of claim 19 wherein the one or more processing servers are further adapted to obtain a user-provided search query that identifies the particular entity; and responsive to the user-provided search query: present, to a user, information identifying (i) a related entity in the one or more related entities and (ii) a description of a relationship between the related entity and the particular entity.

\* \* \* \* \*